US011451615B1

(12) United States Patent
Scrivano

(10) Patent No.: US 11,451,615 B1
(45) Date of Patent: Sep. 20, 2022

(54) PROBABILISTIC PER-FILE IMAGES PRELOADING

(71) Applicant: RED HAT, INC., Raleigh, NC (US)

(72) Inventor: Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/408,657

(22) Filed: Aug. 23, 2021

(51) Int. Cl.
| G06F 15/16 | (2006.01) |
| H04L 67/06 | (2022.01) |
| H04L 67/02 | (2022.01) |
| G06F 9/455 | (2018.01) |
| H04L 67/1097 | (2022.01) |

(52) U.S. Cl.
CPC .......... *H04L 67/06* (2013.01); *G06F 9/45558* (2013.01); *H04L 67/02* (2013.01); *H04L 67/1097* (2013.01); *G06F 2009/45595* (2013.01)

(58) Field of Classification Search
CPC ..... H04L 67/06; H04L 67/02; H04L 67/1097; G06F 9/45558; G06F 2009/45595
USPC .......................................... 709/217, 218, 219
See application file for complete search history.

(56) References Cited

U.S. PATENT DOCUMENTS

| 6,385,641 | B1 * | 5/2002 | Jiang | .................. | H04L 67/5681 |
| | | | | | 709/219 |
| 7,849,156 | B2 | 12/2010 | Alpern et al. | | |
| 10,261,938 | B1 * | 4/2019 | Jenkins | .................. | G06F 15/167 |
| 2003/0126232 | A1 * | 7/2003 | Mogul | ................ | G06F 16/9574 |
| | | | | | 709/219 |
| 2014/0297810 | A1 * | 10/2014 | Zhong | ................... | H04L 65/612 |
| | | | | | 709/219 |
| 2014/0304309 | A1 * | 10/2014 | Diederich | ............. | G06F 16/113 |
| | | | | | 707/812 |
| 2015/0052179 | A1 * | 2/2015 | Novick | ................. | G06F 3/0644 |
| | | | | | 707/827 |
| 2016/0381176 | A1 * | 12/2016 | Cherubini | ............... | H04L 67/63 |
| | | | | | 709/219 |
| 2019/0079788 | A1 * | 3/2019 | Ruty | ....................... | G06F 9/445 |

FOREIGN PATENT DOCUMENTS

CN 110058923 A 7/2019

* cited by examiner

*Primary Examiner* — Liang Che A Wang
(74) *Attorney, Agent, or Firm* — Womble Bond Dickinson (US) LLP

(57) ABSTRACT

A container image including multiple files is provided to multiple containers. First indications of a first set of files being used prior to a first set of containers reaching a ready state are received. Corresponding first values for each file of the multiple files in view of the first indications, wherein the corresponding first values are associated with a first probability that each file will be used prior to a new container reaching the ready state. Second indications of a second set of files being used after a second set of containers have reached the ready state are received. Corresponding second values are determined for each file of the multiple files in view of the second indications, wherein the corresponding second values are associated with a second probability that each file will be used before or after the new container reaches the ready state.

14 Claims, 15 Drawing Sheets

PROBABILISTIC PER-FILE IMAGES PRELOADING

TECHNICAL FIELD

Aspects of the present disclosure relate to a container-orchestration system, and more particularly, to utilizing probabilistic per-file images preloading.

BACKGROUND

Some container-orchestration systems include one or more containers that may contain one or more workloads. An example of a workload is a container image, which can encompass a containerized application, its corresponding runtime environment, or a combination thereof. In one scenario, a component of a container-orchestration system known as a scheduler, uses a process called scheduling, to select resources of a host system to run (e.g., execute, etc.) one or more workloads. A scheduler may monitor a container-orchestration system to discover one or more workloads in the container-orchestration system that are not assigned to and run by or on resources of any host systems in the container-orchestration system.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
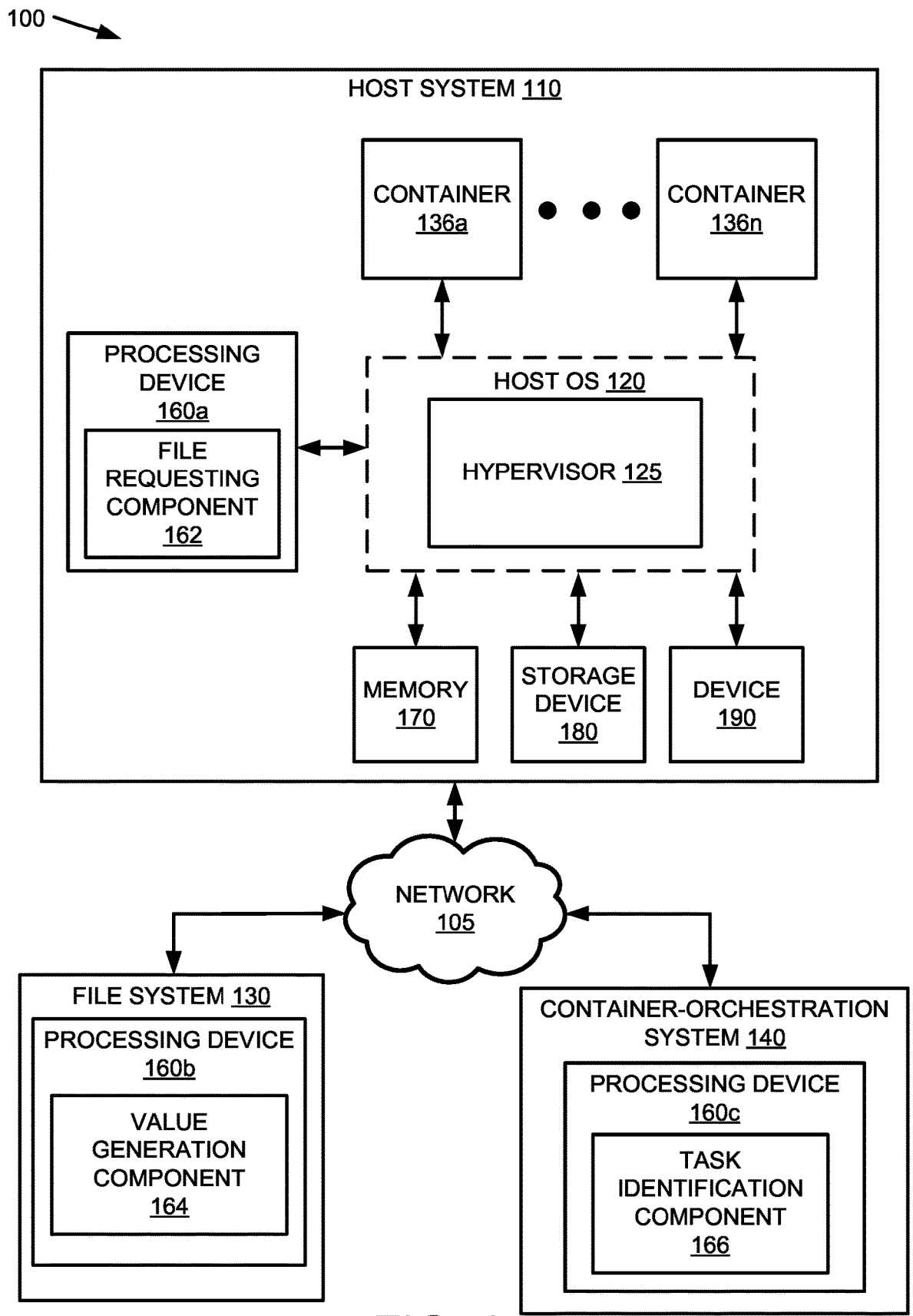
FIG. 1 is a block diagram that illustrates an example container-orchestration architecture, in accordance with some embodiments.

In embodiments, a container-orchestration system may include a host system that supports one or more containers. The containers may serve as isolated execution environments that are used to execute various tasks, such as services or jobs. A service may be an abstraction that described one or more containers in which an application runs and an access policy for the one or more containers. A job may instantiate one or more containers and ensure that a specified number of the one or more containers complete their task and execute. In some embodiments, containers that are to be used to execute a service will typically reach a ready state, while containers that are to be used to execute jobs may not reach a ready state.

In conventional container-orchestration systems, when instantiating a container to execute a task, a container image including files to be used in creating the container is pulled from a file system and stored locally a host system that is supporting the container (also referred to as "preloading" hereafter). Many times, however, the container does not actually use all of the files that are included in the container image. Therefore, resources of the conventional container-orchestration system, such as network bandwidth, processing bandwidth, or memory, are unnecessarily consumed downloading files of the container image that will never be used by the container.

To remedy this, some conventional container-orchestration systems have implemented a system that is referred to as "lazy pulling." In lazy pulling, a container is created without the container image being locally available on the host system. The files from the container image are then loaded on demand when the container accesses the files from the container image. While using lazy pulling may conserve resources by reducing the number of files that are downloaded from the file system, by pulling the files as they are accessed by the container image, the container load time is increased because several files are typically required to be pulled before a container can run, decreasing the performance of the container-orchestration system.

Some conventional container-orchestration systems have addressed this issue by preloading a static set of files from the container image as soon as the container starts to reduce the number of requests for files to the file system before the container reaches a ready state. The use of a static set of files, however, is inefficient in that the static set of files is determined when the container image is built and may not be the optimal selection of files to be preloaded for each container.

Aspects of the disclosure address the above-noted and other deficiencies by utilizing probabilistic per-file image preloading. In embodiments, processing logic of a processing device of a file system may provide a container image including multiple files to a batch of containers, which may be referred to as a test batch. As the containers of the test batch run they may transmit indications to the processing logic about which files from the container image are used. The indications may also include whether each file was used by the container before the container reached a ready state, or after the container reached a ready state.

Using the indications received from the test batch of containers, the processing logic may determine one or more probability values associated with the use of each file from the container image. For example, the processing logic may determine a first value that corresponds to the probability that a file is going to be used by a container before the container reaches a ready state and a second value that corresponds to the probability that a file is going to be used by the container (either before or after the container reaches the ready state). The probability values may then be stored as metadata associated with each of the files in the container image.

By utilizing probabilistic per-file image preloading, the files of a container image may be intelligently selected for preloading for a container based on the probability that the files will be used by the container. By intelligently selecting the files for preloading, the container load time is reduced compared to a "lazy pulling" container-orchestration system. Furthermore, the consumption of resources is reduced compared to a conventional container-orchestration system that pulls all of the files from a container image. Additionally, the use of probabilistic per-file values enables the files that are provided to be dynamically changed to improve performance, rather than a container-orchestration system utilizing a static set of files. For at least the reasons, the use of probabilistic per-file image preloading results in an improved container-orchestration system.

FIG. 1 is a block diagram that illustrates an example computer system architecture 100, in accordance with some embodiments of the present disclosure. It is to be appreciated that other computer system architectures 100 are possible, and that the implementation of a computer system utilizing examples of some or all of the inventive subject matter set forth herein are not necessarily limited to the specific architecture depicted in FIG. 1.

As shown in FIG. 1, the computer system architecture 100 includes host system 110, file system 130, and container-orchestration system 140. The host system 110, file system 130, and container-orchestration system 140 include one or more processing devices 160a-c, memory 170, which may include volatile memory devices (e.g., random access memory (RAM)), non-volatile memory devices (e.g., flash memory) and/or other types of memory devices, storage devices 180 (e.g., one or more magnetic hard disk drives, a Peripheral Component Interconnect (PCI) solid state drive, a Redundant Array of Independent Disks (RAID) system, a network attached storage (NAS) array, etc.), and one or more devices 190 (e.g., a Peripheral Component Interconnect (PCI) device, network interface controller (NIC), a video card, an input/output (I/O) device, etc.). In at least one embodiment, the devices 190 may include one or more processing devices or integrated circuits (ICs), such as one or more central processing units (CPU), one or more graphics processing units (GPU), one or more microprocessors, any other type of processing device or combination of processing devices, or any combination thereof.

Each of the host system 110, file system 130, and container-orchestration system 140 may be a server, a mainframe, a workstation, a personal computer (PC), a mobile phone, a palm-sized computing device, etc. In embodiments, the host system 110, file system 130, and container-orchestration system 140 may be separate computing devices. In some embodiments, host system 110, file system 130, and/or container-orchestration system 140 may be implemented by a single computing device. For clarity, some components of the file system 130 and container-orchestration system 140 are not shown. Furthermore, although the computer system architecture 100 is illustrated as having one host system, embodiments of the disclosure may utilize any number of host systems.

The host system 110 may additionally include a number of containers 136a-n and a host operating system (OS) 120. The container 136a-n act as isolated execution environments for different functions of applications. The host OS 120 manages the hardware resources of the computer system and provides functions such as inter-process communication, scheduling, memory management, and so forth.

The host OS 120 may include a hypervisor 125 (which may also be known as a virtual machine monitor (VMM)), which provides a virtual operating platform for VMs and manages their execution. It is to be appreciated that more than one hypervisor can exist in the architecture 100. The hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. The hypervisor 125 may present other software (e.g., "guest" software) with an abstraction of one or more VMs that provide the same or different abstractions to various guest software (e.g., guest operating system, guest applications, etc.). In some alternative implementations, the hypervisor 125 may be external to host OS 120, rather than embedded within host OS 120, or may replace host OS 120.

The host system 110, file system 130, and container-orchestration system 140 are coupled to each other (e.g., may be operatively coupled, communicatively coupled, may communicate data/messages with each other) via network 105. The network 105 may be a public network (e.g., the internet), a private network (e.g., a local area network (LAN) or wide area network (WAN)), any other network, or a combination thereof. In one embodiment, the network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host system 110, file system 130, and container-orchestration system 140.

The file system 130 may store one or more container images that are used for the creation of containers 163a-n of host system 110. In some embodiments, processing device 160b of file system 130 may execute a value generation component 164. The value generation component 164 may provide files of a container image to a test batch of containers. The value generation component 164 may receive indications from the test batch containers about whether the files are used by the containers and, if so, whether the files were used before or after the containers reached a ready state. The value generation component 164 may then generate probability values for each of the files of the container image.

In embodiments, processing device 160a may execute a file requesting component 162. The file requesting component 162 may identify a threshold value associated with the probability values determined by the value generation component 164 that is used to determine which files are to be pulled from a container image of the file system 130. The file requesting component 162 may generate a request for files of the container image that have a probability value that satisfies the threshold and provide the request to the file system 130.

In an embodiment, processing device 160c may execute a task identification component 166. The task identification component 166 may receive requests to execute various tasks, such as services or jobs. The task identification component 166 may determine what type of task is associated with the request. The task identification component 166 may generate a command to instantiate a container to execute the task that includes the type of task and provide the command to the host system 110. Additional details regarding the file requesting component 162, the value generation component 164, and the task identification component 166 are described at FIGS. 2-11 below.

Figure 2:
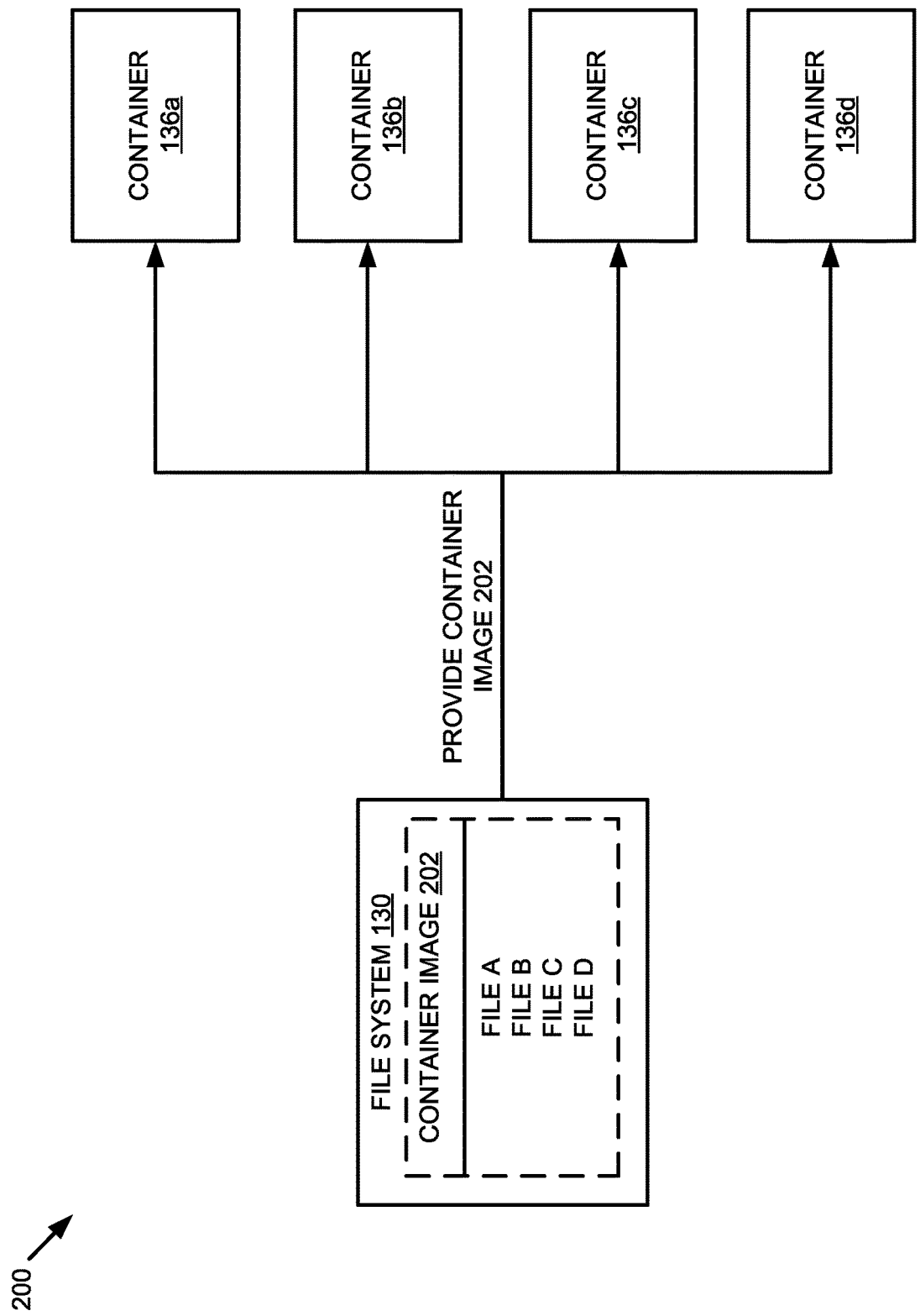
FIG. 2 is an illustration of an example file system of a computer architecture providing files of a container image to a test batch of containers, in accordance with embodiments of the disclosure.

FIG. 2 is an illustration of an example file system of a computer architecture 200 providing files of a container image to a test batch of containers, in accordance with embodiments of the disclosure. The computer architecture 200 includes a file system 130 and containers 136a-d, as previously described at FIG. 1. As previously described, file system 130 may store a container image 202 that includes files (e.g., FILE A, FILE B, FILE C, and FILE D) that may be used by containers 136a-d. To determine the probability that each file will be used by a new container, the file system 130 may provide the files of container image 202 to a test batch of containers, shown in FIG. 2 as containers 136a-d. In some embodiments, containers 136a-d may be supported by a single host system, such as host system 110 of FIG. 1. In embodiments, containers 136a-d may be supported by multiple host systems. Upon providing the files from container image 202 to the host system(s) supporting containers 136a-d, the files may be stored locally at the host system(s) in a memory that is accessible by containers 136a-d. It should be noted that container image 202 is shown for illustrative purposes only and is not a physical component of file system 130.

Figure 3:
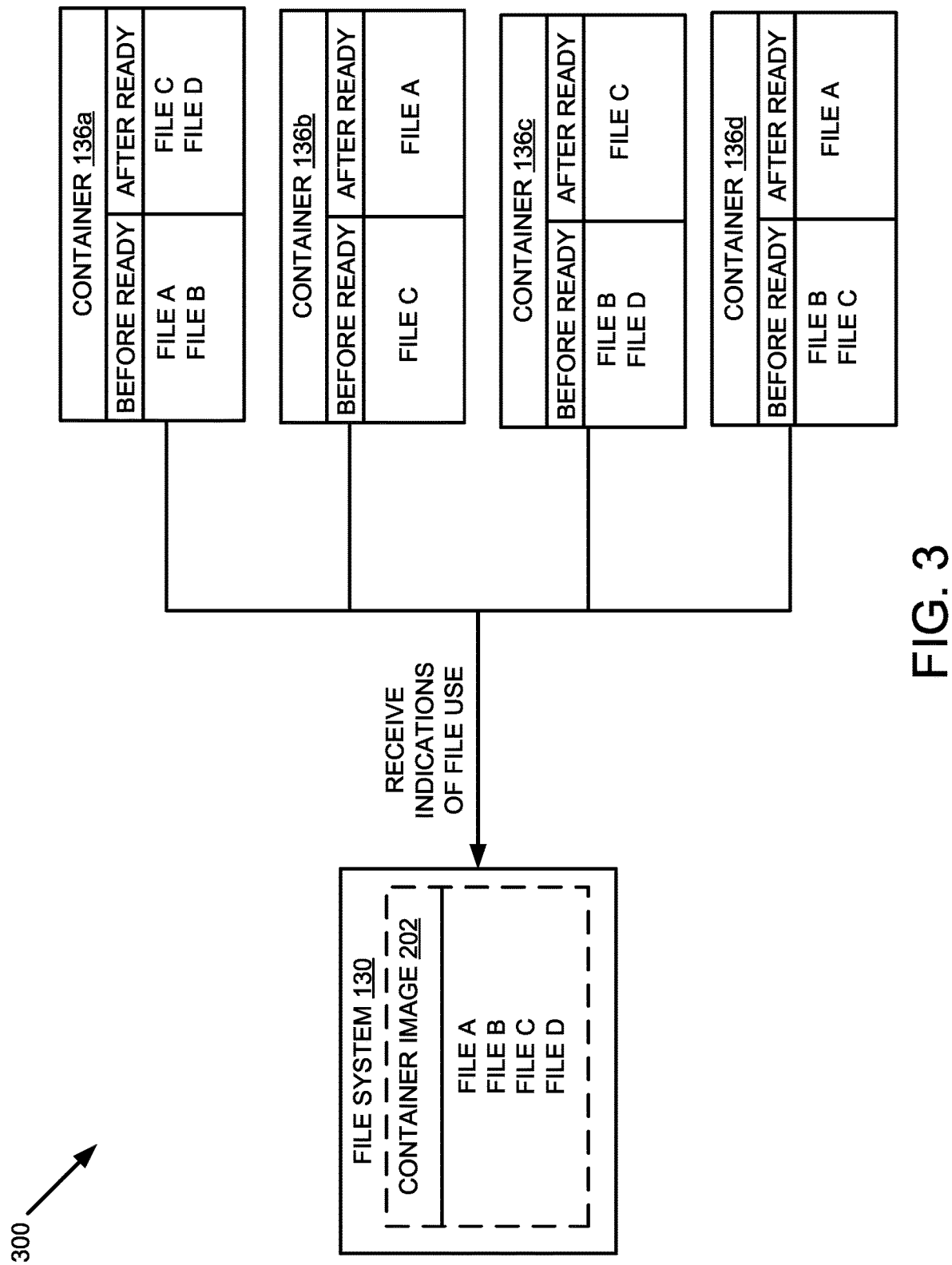
FIG. 3 is an illustration of an example of a file system of a computer architecture receiving indications of file use from a test batch of containers, in accordance with embodiments of the disclosure.

FIG. 3 is an illustration of an example of a file system of a computer architecture 300 receiving indications of file use from a test batch of containers, in accordance with embodiments of the disclosure. In FIG. 3, the file system 130 has provided the files of container image 202 to the host systems supporting containers 136a-d and the files have been stored locally at the host systems. As the containers 136a-d run, processing logic of the file system 130 may receive indications of file use from containers 136a-d that indicate which files were used by each of containers 136a-d, and whether the files were used before each of containers 136a-d reached a ready state (e.g., before ready) or if the files were used after each of containers 136a-d reached a ready state (e.g., after ready). The indications received by the file system 130 may be used to determine probability values associated with each of the files in the container image 202, as will be described in further detail below.

Referring to FIG. 3, file system 130 may receive indications from container 136a that indicate FILE A and FILE B were used before container 136a reached a ready state and FILE C and FILE D were used after container 136a reached a ready state. File system 130 may receive indications from container 136b that FILE C was used before container 136b reached a ready state and FILE A was used after container 136b reached a ready state. File system 130 may additionally receive indications from container 136c that FILE B and FILE D were used before container 136c reached a ready state and FILE C was used after container 136c reached a ready state. File system 130 may further receive indications from container 136d that FILE B and FILE C were used before container 136d reached a ready state and FILE A was used after container 136d reached a ready state.

Figure 4:
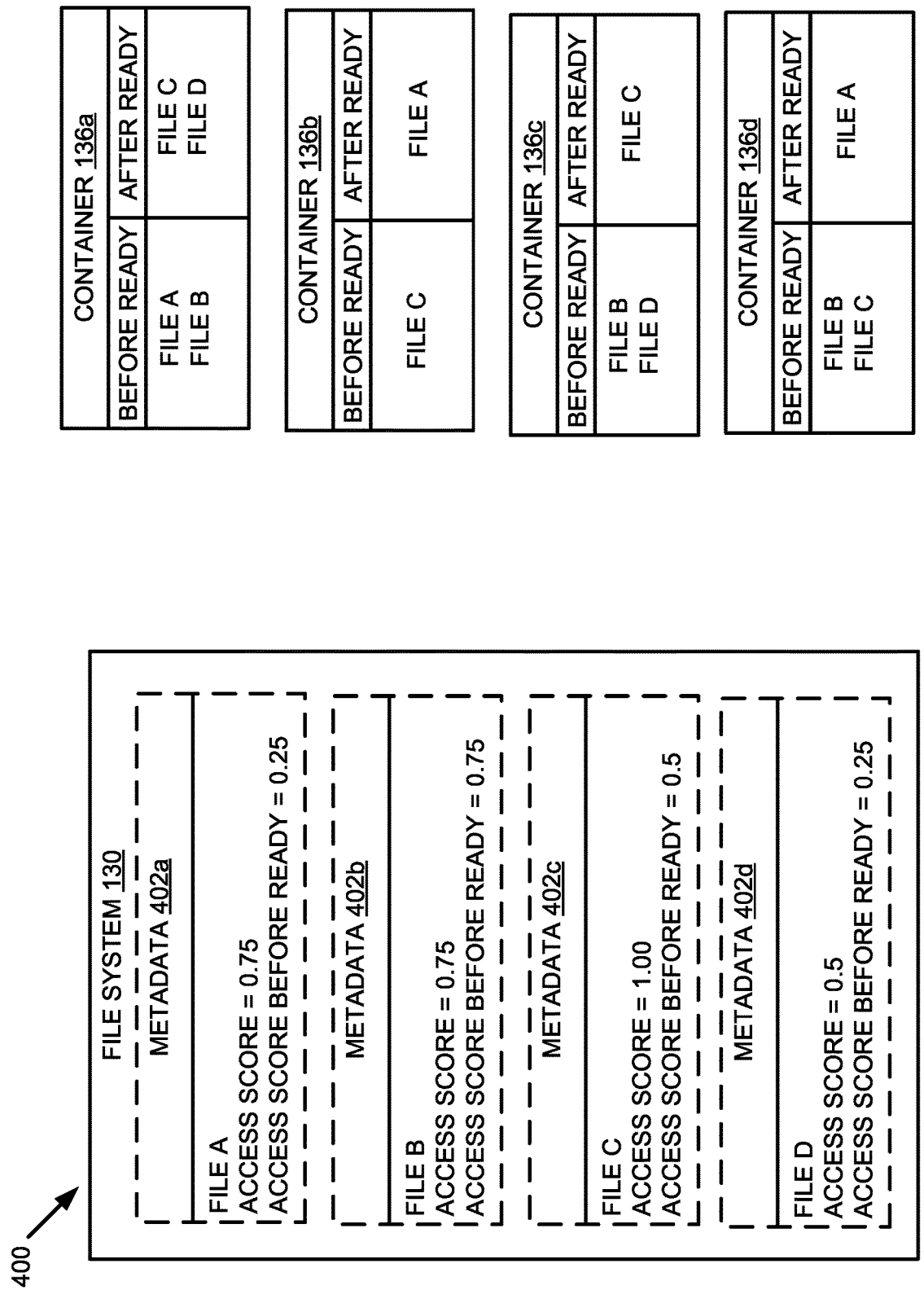
FIG. 4 is an illustration of an example of a file system of a computer architecture determining probability values for each file of a container image, in accordance with embodiments of the disclosure.

FIG. 4 is an illustration of an example of a file system of a computer architecture 400 determining probability values for each file of a container image, in accordance with embodiments of the disclosure. In FIG. 4, processing logic of the file system 130 has received the indications of use of the files (e.g., FILE A, FILE B, FILE C, and FILE D) from the container image (not shown) of FIG. 2. Upon receiving the indications, the processing logic may determine corresponding probability values for each of the files and store the corresponding probability values in metadata 402a-d associated with the files. The processing logic may determine a first probability value that corresponds to the probability that a file is going to be used by a container either before or after the container reaches a ready state (e.g., access score). The processing logic may determine a second probability value that corresponds to the probability that the file is going to be used by a container before reaching a ready state (e.g., access score).

Referring to FIG. 4, FILE A was used by container 136a before container 136a reached a ready state and was used by containers 136b, d after containers 136b, d have reached a ready state. The processing logic may then determine that the access score for FILE A is 0.75 because FILE A was used by 3 out of the 4 containers in the test batch. The processing logic may also determine that the access score before ready for FILE A is 0.25 because FILE A was used by 1 out of the 4 containers before the container reached a ready state. The processing logic may then save the access score and access score before ready for FILE A as metadata 402a associated with FILE A. This process may be repeated for the remaining files of the container image to generate corresponding probability values and save the probability values in metadata (e.g., metadata 402b-d) associated with the remaining files (e.g., FILES B-D) of the container image.

Figure 5A:
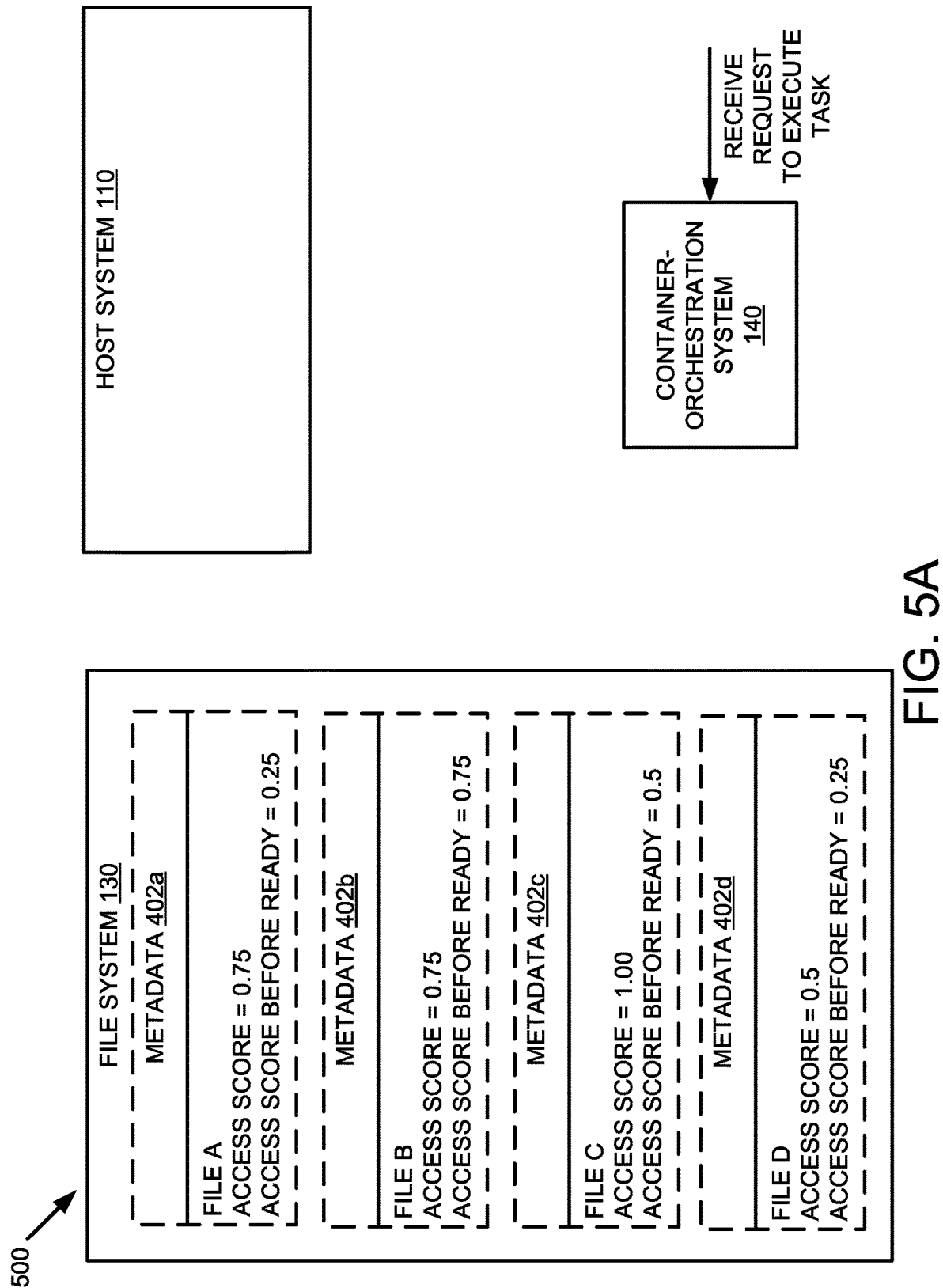
FIG. 5A is an illustration of an example of a container-orchestration system of a computer architecture receiving a request to execute a task, in accordance with embodiments of the disclosure.

FIG. 5A is an illustration of an example of a container-orchestration system of a computer architecture 500 receiving a request to execute a task, in accordance with embodiments of the disclosure. The computer architecture 500 may include host system 110, file system 130, and container-orchestration system 140 of FIG. 1. The computer architecture 500 may further include metadata 402a-d of FIG. 4. The container-orchestration system 140 may receive a request for the computer architecture 500 to execute a task. In embodiments, different types of tasks may be received by the container-orchestration system 140. For example, the container-orchestration system 140 may receive a request from a client device (not shown) to execute a service, a job, or a combination thereof.

Upon receiving the request, the container-orchestration system 140 may determine which type of task is to be performed by the computer architecture 500. For example, upon receiving the request, processing logic of the container-orchestration system 140 may determine whether the task associated with the request corresponds to a service, a job, or some combination of a service or a job. In some embodiments where the task is a combination of different types of tasks, the processing logic may assign weights to the types of tasks associated with the request. For example, if the processing logic determines that a task is 75% a service and 25% a job, then the processing logic may assign a weight of 0.75 to the service type and a weight of 0.25 to the job type. In some embodiments, the type of task that is to be performed and/or determining the weights to be assigned may be determines using a machine learning algorithm executed by the processing logic of the container-orchestration system 140.

Figure 5B:
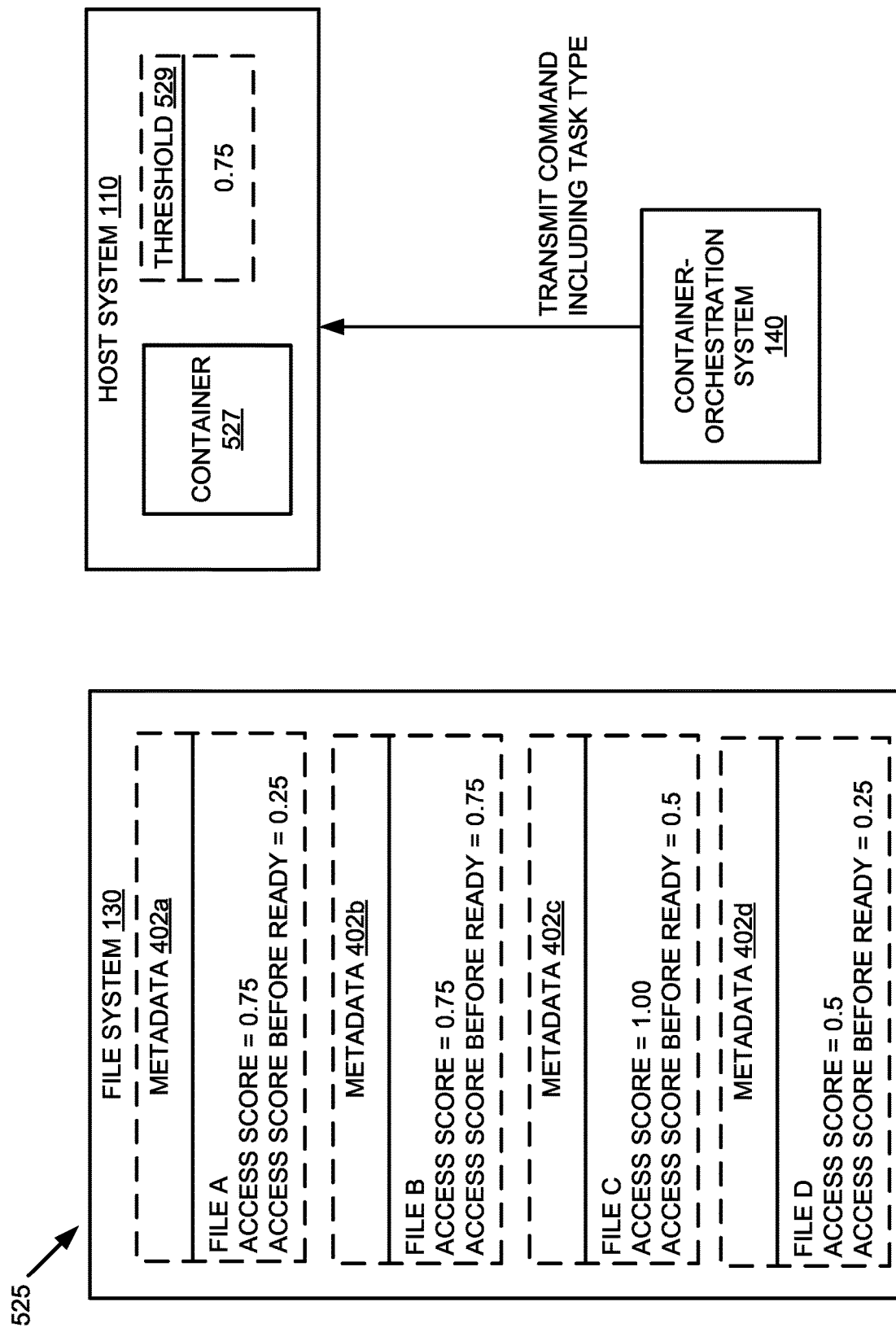
FIG. 5B is an illustration of an example of a container-orchestration system of a computer architecture transmitting a command to instantiate a container that includes a task type to a host system, in accordance with embodiments of the disclosure.

FIG. 5B is an illustration of an example of a container-orchestration system of a computer architecture 525 transmitting a command to instantiate a container that includes a task type to a host system, in accordance with embodiments of the disclosure. In FIG. 5B, the container-orchestration system 140 has determined which type of task is associated with a request, as previously described at FIG. 5A. The container-orchestration system 140 may transmit a command to host system 110 to instantiate a container that includes the type of task that is to be executed using the container. For example, the container-orchestration system 140 may transmit a command to host system 110 to instantiate a container that indicates the container is to execute a job.

The type of task received from the container-orchestration system 140 may be used by processing logic of the host system 110 to determine which of the probability values (e.g., the access score or the access score before ready) is to be used by the file system 130 when determining which files of a container image are to be sent to be stored locally in the host system 110. For example, if the type of task to be performed is a job, where the container may never reach a ready state, then the access score may be used to determine which files of the container image are to be sent. In another example, if the type of task to be performed is a service, where the container is to reach a ready state, then the access score before ready may be used to determine which files of the container image are sent. In a further example, if the task is a combination of types of tasks, both scores may be used and, in some embodiments, the weights assigned to each of the types of tasks may be applied to the access score and the access score before ready.

Upon receiving the command from the container-orchestration system 140, the processing logic of the host system 110 may identify a threshold 529 that is used to determine which files are to be sent by the file system 130 to be stored locally at the host system 110, as will be described in further detail below. The host system 110 may instantiate the container 527 that is to be used to execute the task associated with the request received at FIG. 5A.

Figure 5C:
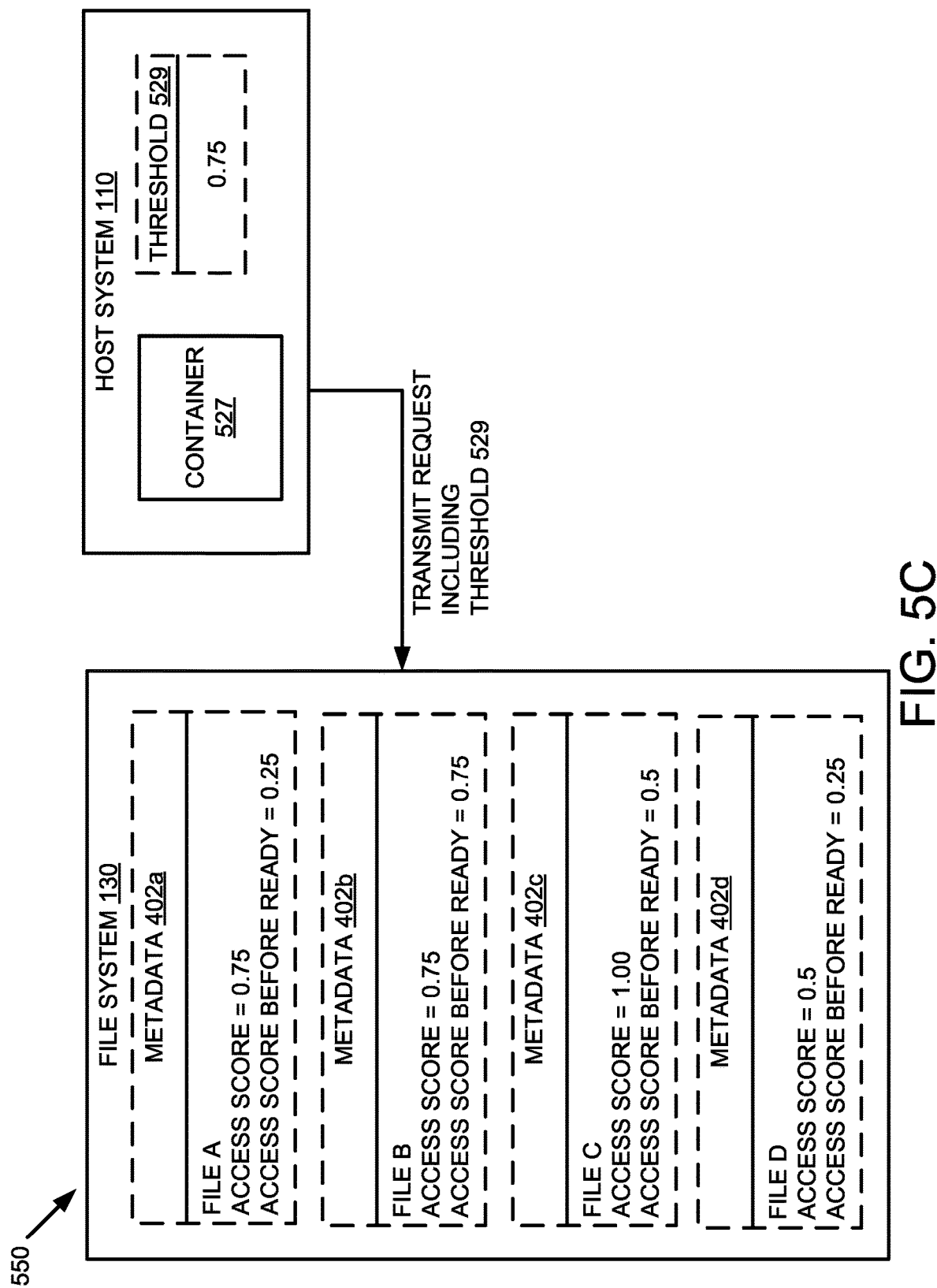
FIG. 5C is an illustration of an example of a host system of a computer architecture transmitting a request for files of a container image that includes a threshold, in accordance with embodiments of the disclosure.

FIG. 5C is an illustration of an example of a host system of a computer architecture 550 transmitting a request for files of a container image that includes a threshold, in accordance with embodiments of the disclosure. In FIG. 5C, the host system 110 has identified threshold 529 that is to be used to determine which files of the container image are to be sent. The host system 110 may transmit a request to the file system 130 that includes the threshold 529. In embodiments, the request may also include an indication of which score is to be used to select the files. For example, the request may indicate whether the access score or the access score before ready is to be used for determining which files are to be sent to the host system 110 in view of the threshold 529.

Figure 5D:
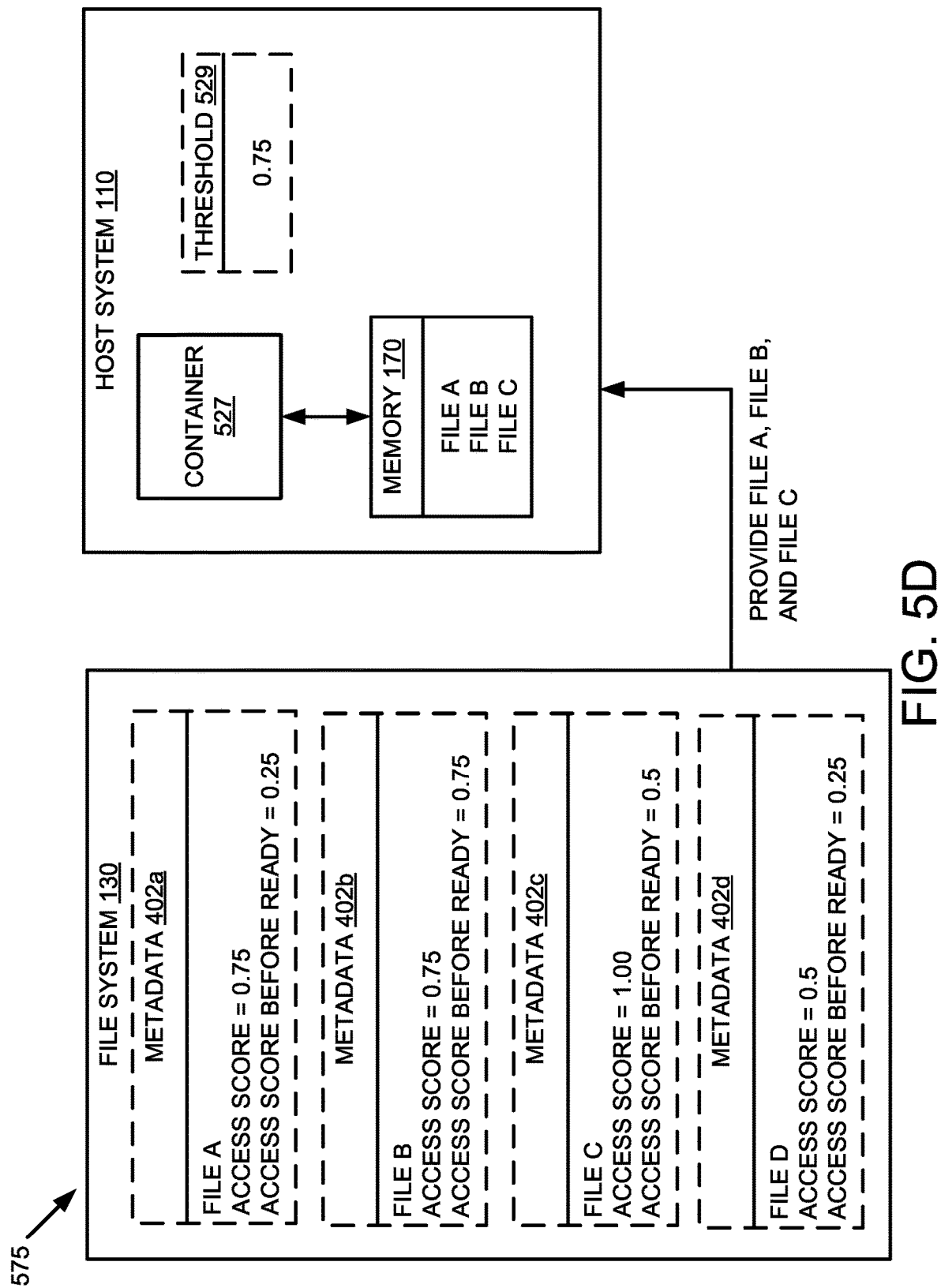
FIG. 5D is an illustration of an example of a file system of a computer architecture providing files of a container image having probability values that satisfy a threshold, in accordance with embodiments of the disclosure.

FIG. 5D is an illustration of an example of a file system of a computer architecture 575 providing files of a container image having probability values that satisfy a threshold, in accordance with embodiments of the disclosure. In FIG. 5D, the file system 130 received a request including threshold 529 from host system 110, as previously described at FIG. 5C.

Referring to FIG. 5D, for illustrative purposes the request including threshold 529 indicated that the access score is to be used to determine which files (e.g., FILE A, FILE B, FILE C, or FILED) are to be provided to the host system 110. Processing logic of the file system 130 may read the corresponding metadata 402a-d for each of the files to determine which of the files have access scores that satisfy the threshold 529. In embodiments, the access score may satisfy the threshold 529 if the access score is greater than or equal to the value of threshold 529. Metadata 402a indicates that FILE A has an access score of 0.75, metadata 402b indicates that FILE B has an access score of 0.75, metadata 402c indicates that FILE C has an access score of 1.00, and metadata 402d indicates that FILED has an access score of 0.5. Because FILE A, FILE B, and FILE C have corresponding access scores that are greater than or equal to the threshold 529, file system 130 may provide FILE A, FILE B, and FILE C to host system 110. Upon receipt of the files, host system 110 may store the files in locally in memory 170 that is accessibly by container 527.

In some embodiments, after transmitting the request, host system may identify a particular file that is to be used by container 527. For example, container 527 may attempt to access FILE D. In such a scenario, host system 110 may transmit a subsequent request for FILE D to file system 130. Upon receiving the subsequent request, the file system 130 may halt or pause providing FILE A, FILE B, and FILE C to the host system 110. The file system 130 may then provide FILE D to host system 110. Once FILE D has been provided to host system 110, the file system 130 may resume providing FILE A, FILE B, and FILE C to host system 110.

Figure 6:
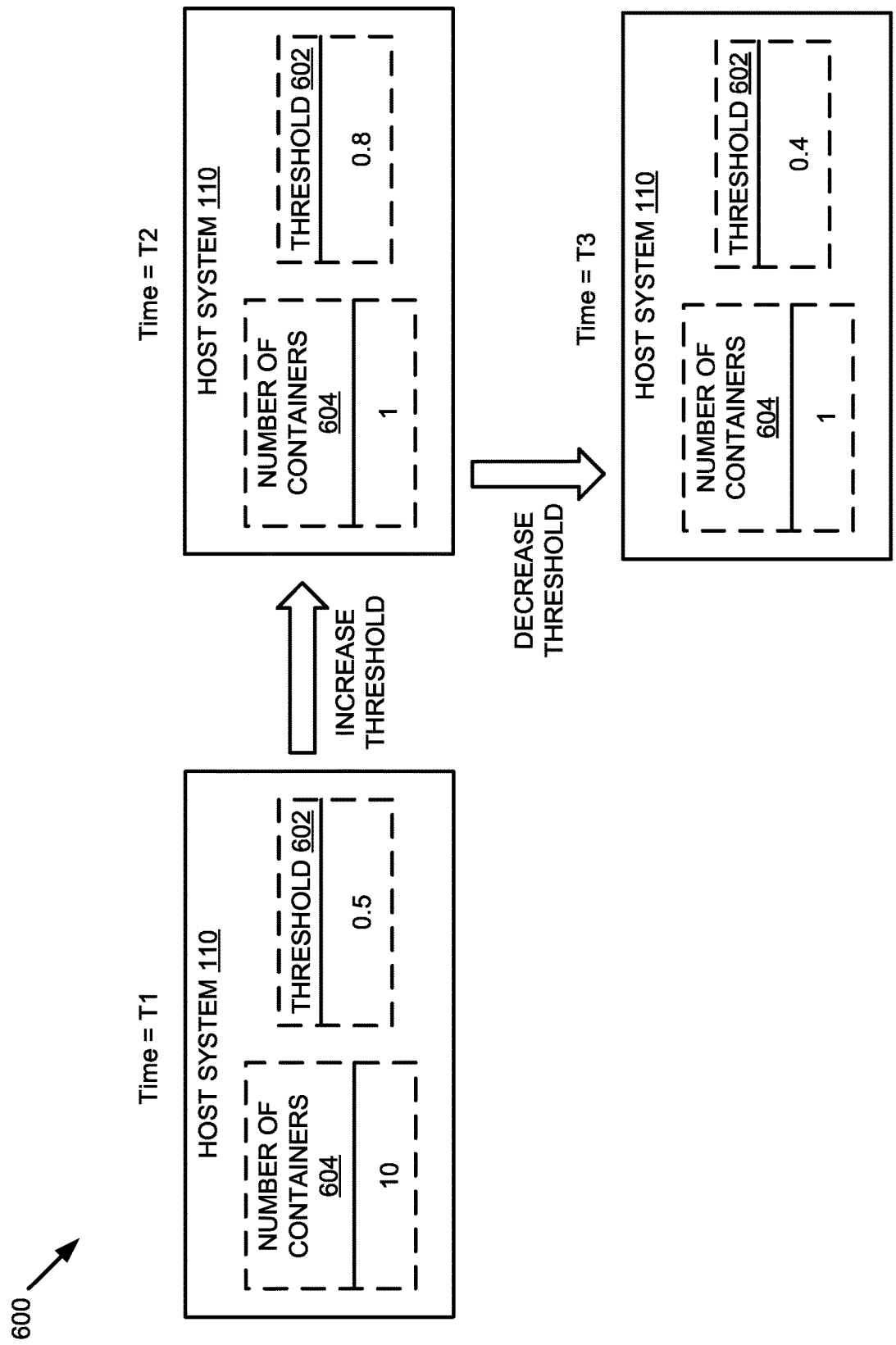
FIG. 6 is an illustration of an example of a host system of a computer architecture dynamically adjusting a threshold based on available resources, in accordance with embodiments of the disclosure.

FIG. 6 is an illustration of an example of a host system of a computer architecture 600 dynamically adjusting a threshold based on available resources, in accordance with embodiments of the disclosure. Computer architecture 600 includes a host system 110, which has a threshold 602 that may correspond to threshold 529 of FIG. 5B and a number of containers 604 that are supported by host system 110.

In some embodiments, processing logic of host system 110 may dynamically adjust the threshold 602 based on the resources of host system 110. Examples of resources of host system 110 may include, but are not limited to, the number of containers supported by host system 110, network bandwidth, available memory, processing bandwidth, or available storage. For illustrative purposes, only the number of containers 604 are included in FIG. 6, but embodiments of the disclosure may dynamically adjust the threshold based on any type of resource associated with host system 110.

Referring to FIG. 6, at a first time (T1) the host system 110 may be supporting 10 containers and have an initial threshold 602 of 0.5. Because the host system 110 is supporting a larger number of containers 604, the host system 110 may increase the threshold 602 to 0.8. By increasing the value of the threshold 602, the number of files of container images sent to each of the containers supported by host system 110 is reduced. By reducing the number of files sent to each container, the resources of host system 110 may be conserved to prevent bottlenecking of the host system 110. At a second time (T2) the number of containers 604 supported by host system 110 has decreased to one container. Because there are less containers being supported by host system 110, more resources of host system 110 are available for storing files locally at host system for the one container. Because of this, at a third time (T3) the host system 110 may decrease the threshold 602 to 0.4 so that more files of the container images are sent.

Figure 7:
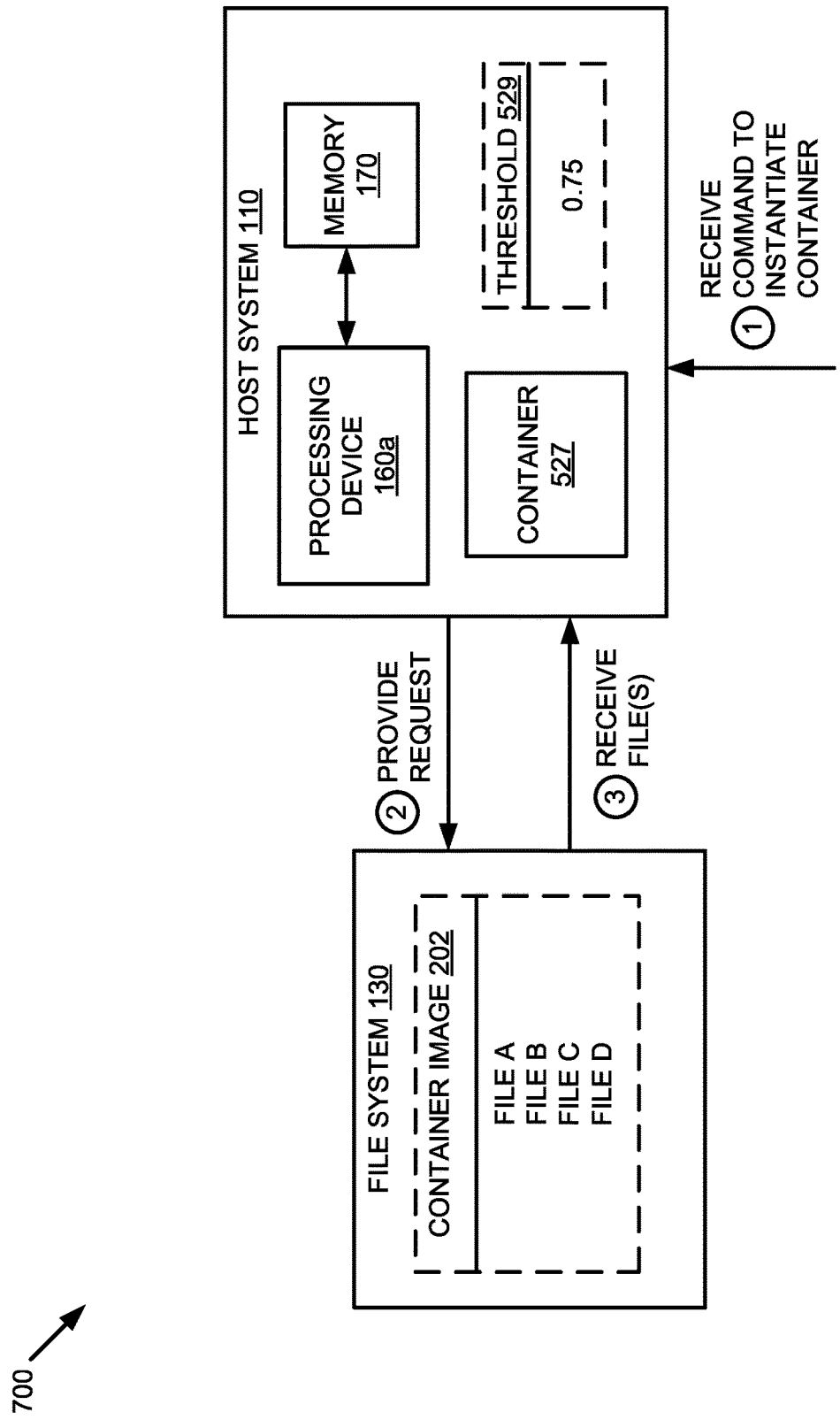
FIG. 7 is a component diagram of an example of a computer architecture, in accordance with embodiments of the disclosure.

FIG. 7 is a component diagram of an example of a computer architecture 700, in accordance with embodiments of the disclosure. The computer architecture 700 includes host system 110, file system 130, processing device 160a, and memory 170 of FIG. 1. The computer architecture 700 further includes container 527 and threshold 529 of FIG. 5 as well as container image 202 of FIG. 2.

Referring to FIG. 7, the host system 110 may receive a command to instantiate a container. Upon receiving the command to instantiate the container, the host system 110 may provide a request for files from container image 202 that includes threshold 529. The file system 130 may identify one or more files of container image 202 that satisfy the threshold 529 and provide the one or more files to the host system 110.

Figure 8:
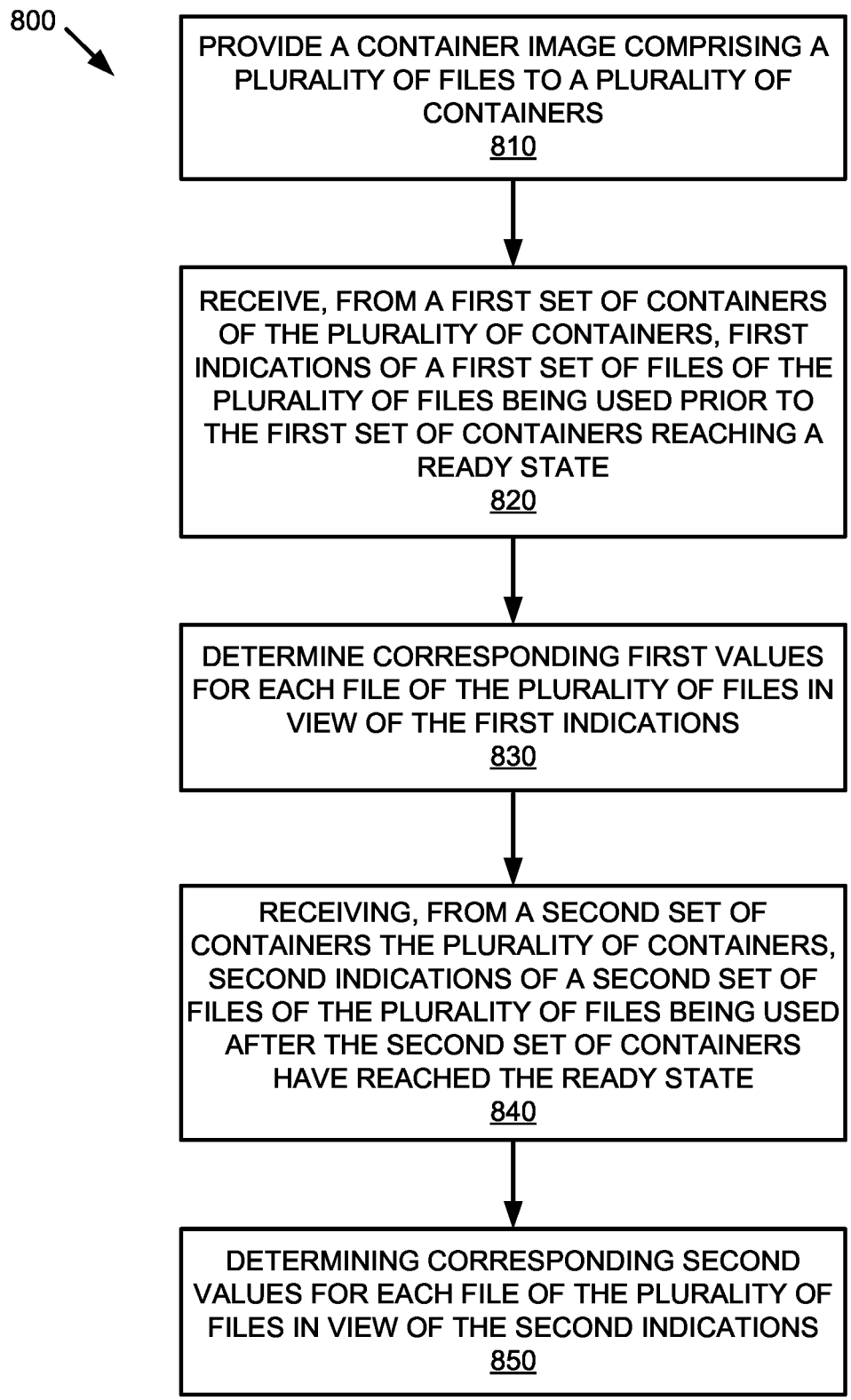
FIG. 8 is a flow diagram of a method of determining probability values of files of a container image, in accordance with some embodiments.

FIG. 8 is a flow diagram of a method 800 of determining probability values of files of a container image, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by value generation component 164 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic provides a container image comprising a plurality of files to a plurality of containers.

At block 820, the processing logic receives, from a first set of containers of the plurality of containers, first indications of a first set of files of the plurality of files being used prior to the first set of containers reaching a ready state.

At block 830, the processing logic determines corresponding first values for each file of the plurality of files in view of the first indications. The corresponding first values may be associated with a first probability that each file will be used prior to a new container reaching a ready state.

At block 840, the processing logic receives, from a second set of containers the plurality of containers, second indications of a second set of files of the plurality of files being used after the second set of containers have reached the ready state.

At block 850, the processing logic determines corresponding second values for each file of the plurality of files in view of the second indications. The corresponding second values may be associated with a second probability that each file will be used before or after the new container reaches the ready state.

Figure 9:
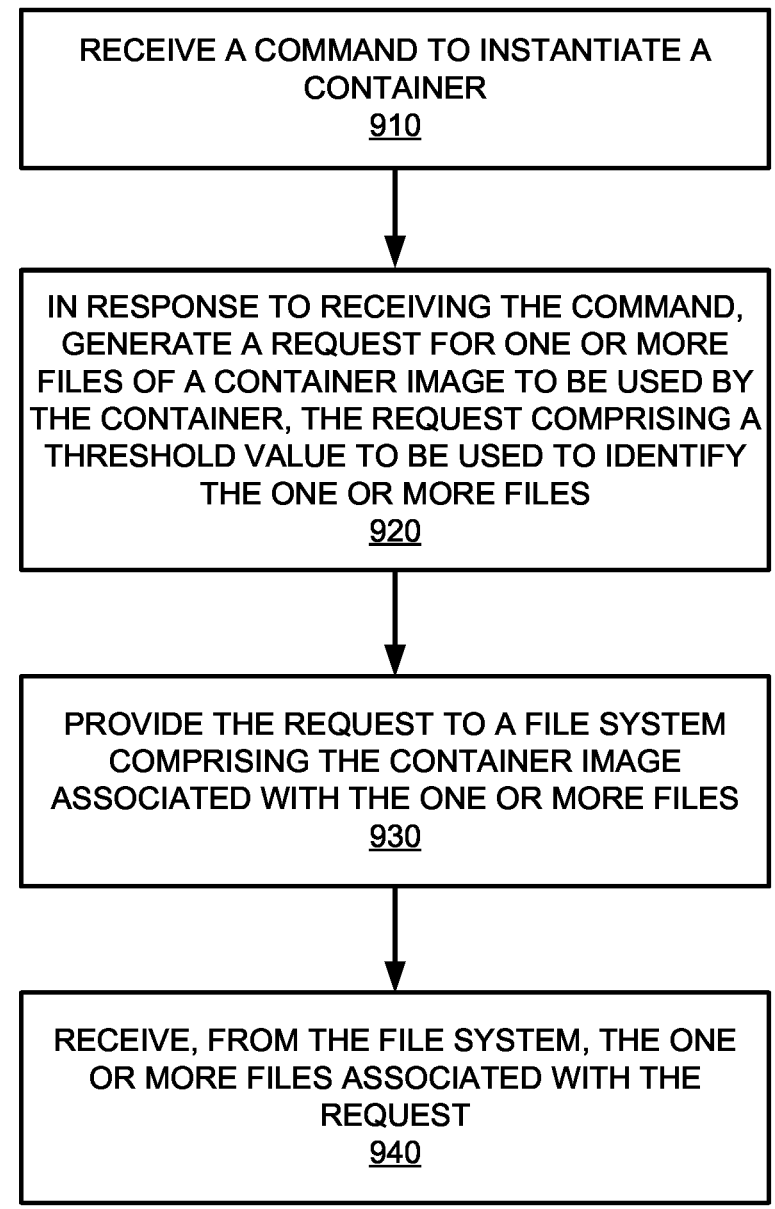
FIG. 9 is a flow diagram of a method of generating a request for files of a container image including a threshold, in accordance with some embodiments.

FIG. 9 is a flow diagram of a method 900 of generating a request for files of a container image including a threshold, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by file requesting component 162 of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives a command to instantiate a container.

At block 920, in response to receiving the command, the processing logic generates a request for one or more files of a container image to be used by the container, the request comprising a threshold value to be used to identify the one or more files.

At block 930, the processing logic provide the request to a file system comprising the container image associated with the one or more files.

At block 940, the processing logic receives, from the file system, the one or more files associated with the request.

Figure 10:
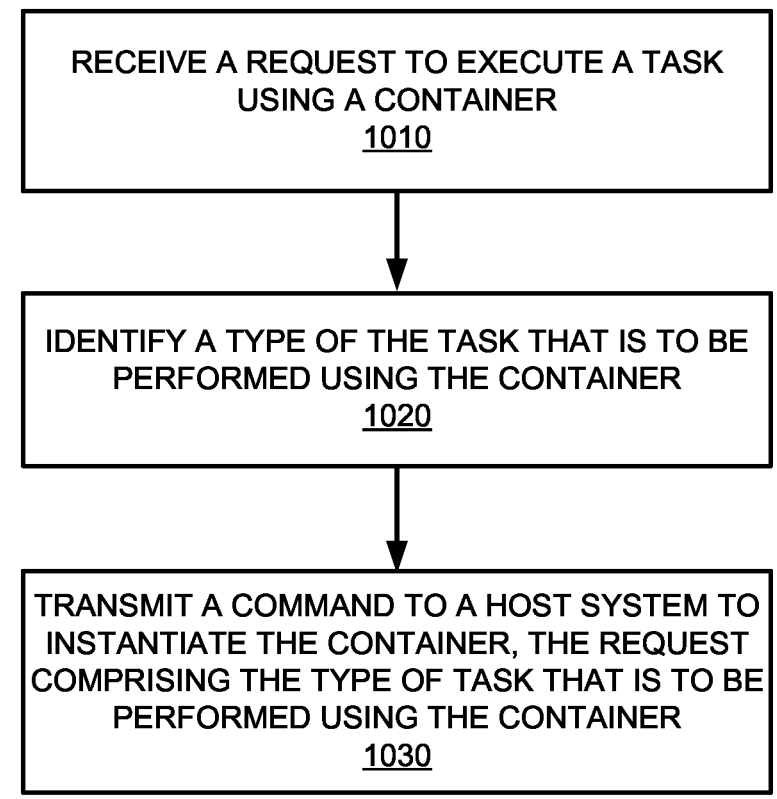
FIG. 10 is a flow diagram of a method of a container-orchestration system identifying a type of task associated with a request, in accordance with some embodiments.

FIG. 10 is a flow diagram of a method 1000 of a container-orchestration system identifying a type of task associated with a request, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by task identification component 166 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic receives a request to execute a task using a container.

At block 1020, the processing logic identifies a type of the task that is to be performed using the container.

At block 1030, the processing logic transmits a command to a host system to instantiate the container, the request comprising the type of task that is to be performed using the container.

Figure 11:
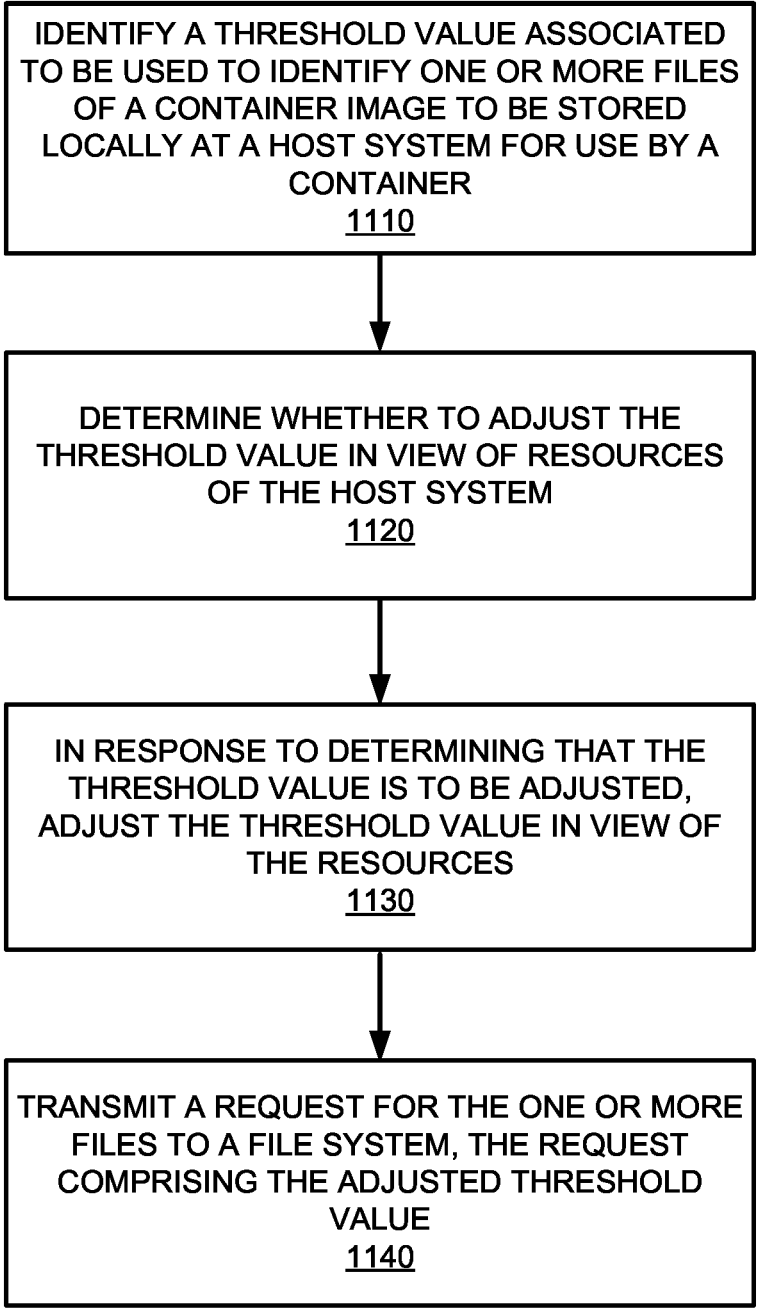
FIG. 11 is a flow diagram of a method of a host system dynamically adjusting a threshold used to identify files of a container image, in accordance with some embodiments.

FIG. 11 is a flow diagram of a method 1100 of a host system dynamically adjusting a threshold used to identify files of a container image, in accordance with some embodiments. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof In some embodiments, at least a portion of method 1100 may be performed by file requesting component 162 of FIG. 1.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic identifies a threshold value associated to be used to identify one or more files of a container image to be stored locally at a host system for use by a container.

At block 1120, the processing logic determines whether to adjust the threshold value in view of resources of the host system.

At block 1130, in response to determining that the threshold value is to be adjusted, the processing logic adjusts the threshold value in view of the resources.

At block 1140, the processing logic transmits a request for the one or more files to a file system that includes the adjusted threshold value.

Figure 12:
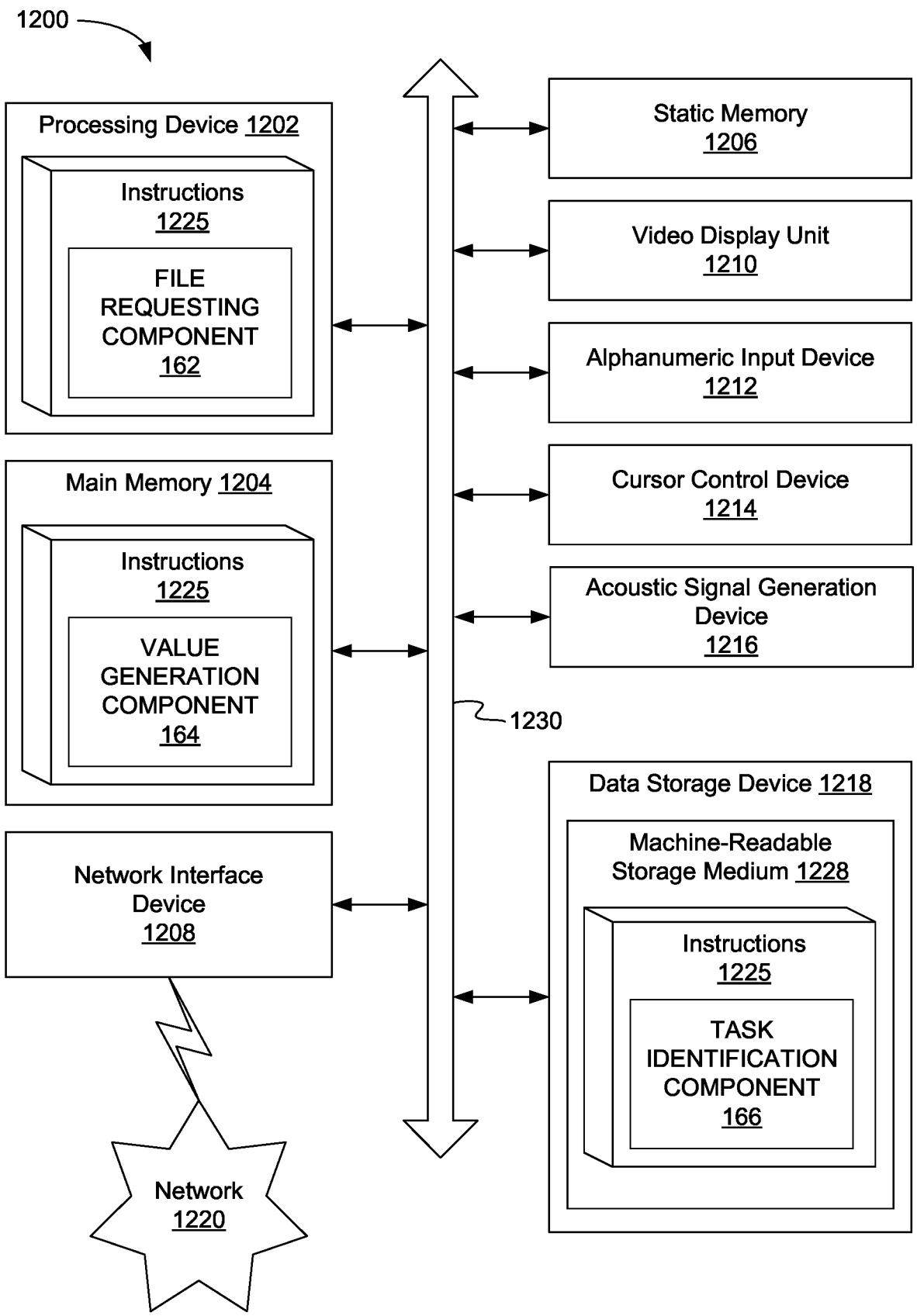
FIG. 12 is a block diagram of an example apparatus that may perform one or more of the operations described herein, in accordance with some embodiments of the present disclosure.

FIG. 12 is a block diagram of an example computing device 1200 that may perform one or more of the operations described herein, in accordance with some embodiments. Computing device 1200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general purpose processor, a PLD, etc.) 1202, a main memory 1204 (e.g., synchronous dynamic random access memory (DRAM), read-only memory (ROM)), a static memory 1206 (e.g., flash memory and a data storage device 1218), which may communicate with each other via a bus 1230.

Processing device 1202 may be provided by one or more general-purpose processing devices such as a microprocessor, central processing unit, or the like. In an illustrative example, processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also comprise one or more special-purpose processing devices such as an application specific integrated circuit (ASIC), a field programmable gate array (FPGA), a digital signal processor (DSP), network processor, or the like. The processing device 1202 may be configured to execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions 1225 that may include instructions for a file requesting component, e.g., file requesting component 162, a value generation component, e.g., value generation component 164, or a task identification component, e.g., task identification component 166 for carrying out the operations described herein, in accordance with one or more aspects of the present disclosure. Instructions 1225 may also reside, completely or at least partially, within main memory 1204 and/or within processing device 1202 during execution thereof by computing device 1200, main memory 1204 and processing device 1202 also constituting computer-readable media. The instructions 1225 may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: providing a container image comprising a plurality of files to a plurality of containers; receiving, from a first set of containers of the plurality of containers, first indications of a first set of files of the plurality of files being used prior to the first set of containers reaching a ready state; determining, by a processing device, corresponding first values for each file of the plurality of files in view of the first indications, wherein the corresponding first values are associated with a first probability that each file will be used prior to a new container reaching the ready state; receiving, from a second set of containers the plurality of containers, second indications of a second set of files of the plurality of files being used after the second set of containers have reached the ready state; and determining corresponding second values for each file of the plurality of files in view of the second indications, wherein the corresponding second values are associated with a second probability that each file will be used before or after the new container reaches the ready state.

Example 2 is the method of Example 1, wherein the corresponding first values and the corresponding second values for each of the plurality of files are stored as metadata associated with each of the plurality of files.

Example 3 is the method of any of Examples 1-2, further comprising: receiving, from a host system, a request for one or more files of the plurality of files of the container image, the request comprising a threshold value associated one of the corresponding first values or the corresponding second values.

Example 4 is the method of any of Examples 1-3, wherein the threshold value is associated with the corresponding first values, the method further comprising: identifying the one or more files of the plurality of files having corresponding first values that satisfy the threshold value; and providing the one or more files to the host system.

Example 5 is the method of any of Examples 1-4, further comprising: receiving, from the host system, a subsequent request for a particular file of the plurality of files; halting the providing of the one or more files to the host system; providing the particular file to the host system; and resuming the providing of the one or more files to the host system.

Example 6 is the method of any of Examples 1-5, wherein the one or more files are to be used by a container supported by the host system.

Example 7 is the method of any of Examples 1-6, wherein the corresponding first values are used to identify the one or more files to be used by a container executing a service and wherein the corresponding second values are used to identify the one or more files to be used by a container executing a job.

Example 8 is the method of any of Examples 1-7, further comprising: receiving, from a host system, a request for one or more files of the plurality of files of the container image, the request comprising a threshold value associated with a combination of the corresponding first values and the corresponding second values.

Example 9 is a system comprising: a memory; and a processing device, operatively coupled to the memory, to: receive a command to instantiate a container; in response to receiving the command, generate a request for one or more files of a container image to be used by the container, the request comprising a threshold value to be used to identify the one or more files; provide the request to a file system comprising the container image associated with the one or more files; and receive, from the file system, the one or more files associated with the request.

Example 10 is the system of Example 9, wherein the threshold value is associated with a probability that the one or more files are to be used by the container to reach a ready state.

Example 11 is the system of any of Examples 9-10, wherein the threshold value is associated with a probability that the one or more files are to be used by the container.

Example 12 is the system of any of Examples 9-11, wherein the processing device is further to: store the one or more files in the memory, wherein the one or more files are accessible by the container.

Example 13 is the system of any of Examples 9-12, wherein the processing device is further to: identify a particular file of the container image to be used by the container; and provide a subsequent request to the file system for the particular file.

Example 14 is the system of any of Examples 9-13, wherein the threshold value may be adjusted in view of available resources of the system.

Example 15 is the system of any of Examples 9-14, wherein the resources comprise one or more of a number of containers supported by the system, network bandwidth of the system, available memory of the system, or processing bandwidth of the system.

Example 16 is the system of any of Examples 9-15, wherein the threshold value is determined in view of a type of task to be performed using the container.

Example 17 is the system of any of Examples 9-16, wherein the type of task to be performed using the container is received from a container-orchestration system.

Example 18 is a non-transitory computer-readable storage medium including instructions that, when executed by a processing device, cause the processing device to: receive a request to execute a task using a container; identify a type of the task that is to be performed using the container; and transmit a command to a host system to instantiate the container, the request comprising the type of task that is to be performed using the container.

Example 19 is the non-transitory computer-readable storage medium of Example 18, wherein the processing device executes a machine learning algorithm that determines the type of the task.

Example 20 is the non-transitory computer-readable storage medium of any of Examples 18-19, wherein the type of task is to be utilized by the host system to identify a threshold value for requesting one or more files of a container image.

Example 21 is the non-transitory computer-readable storage medium of any of Examples 18-20, wherein the type of task comprises one of a service or a job.

Example 22 is the non-transitory computer-readable storage medium of any of Examples 18-21, wherein the type of task comprises a combination of a service portion and a job portion.

Example 23 is the non-transitory computer-readable storage medium of any of Examples 18-22, wherein the processing device is further to: assign a first weight to the job portion and a second weight to the job portion, wherein the command transmitted to the host system comprises the first weight and the second weight.

Example 24 is a method comprising: identifying a threshold value associated to be used to identify one or more files of a container image to be stored locally at a host system for use by a container; determining whether to adjust the threshold value in view of resources of the host system; in response to determining that the threshold value is to be adjusted, adjusting, by a processing device, the threshold value in view of the resources; and transmitting a request for the one or more files to a file system, the request comprising the adjusted threshold value.

Example 25 is the method of Example 24, wherein the threshold value is identified in response to receiving a command to instantiate the container.

Example 26 is the method of any of Examples 24-25, wherein the command comprises an indication of a type of task to be performed by the container and wherein the threshold value is identified in view of the type of task.

Example 27 is the method of any of Examples 24-26, wherein the type of task to be performed using the container is received from a container-orchestration system.

Example 28 is the method of any of Examples 24-27, wherein the resources comprise one or more of a number of containers supported by the host system, network bandwidth of the host system, available memory of the host system, or processing bandwidth of the host system.

Example 29 is the method of any of Examples 24-28, further comprising: identifying a particular file of the container image to be used by the container; and transmitting a subsequent request to the file system for the particular file.

Example 30 is the method of any of Examples 24-29, wherein the threshold value is associated with a probability that the one or more files are to be used by the container to reach a ready state.

Example 31 is the method of any of Examples 24-30, wherein the threshold value is associated with a probability that the one or more files are to be used by the container.

Example 32 is an apparatus comprising: means for providing a container image comprising a plurality of files to a plurality of containers; means for receiving, from a first set of containers of the plurality of containers, first indications of a first set of files of the plurality of files being used prior to the first set of containers reaching a ready state; means for determining corresponding first values for each file of the plurality of files in view of the first indications, wherein the corresponding first values are associated with a first probability that each file will be used prior to a new container reaching the ready state; means for receiving, from a second set of containers the plurality of containers, second indications of a second set of files of the plurality of files being used after the second set of containers have reached the ready state; and means for determining corresponding second values for each file of the plurality of files in view of the second indications, wherein the corresponding second values are associated with a second probability that each file will be used before or after the new container reaches the ready state.

Example 33 is the apparatus of Example 32, wherein the corresponding first values and the corresponding second values for each of the plurality of files are stored as metadata associated with each of the plurality of files.

Example 34 is the apparatus of any of Examples 32-33, further comprising: means for receiving, from a host system, a request for one or more files of the plurality of files of the container image, the request comprising a threshold value associated one of the corresponding first values or the corresponding second values.

Example 35 is the apparatus of any of Examples 32-34, wherein the threshold value is associated with the corresponding first values, the apparatus further comprising: means for identifying the one or more files of the plurality of files having corresponding first values that satisfy the threshold value; and means for providing the one or more files to the host system.

Example 36 is the apparatus of any of Examples 32-35, further comprising: means for receiving, from the host system, a subsequent request for a particular file of the plurality of files; means for halting the providing of the one or more files to the host system; means for providing the particular file to the host system; and means for resuming the providing of the one or more files to the host system.

Example 37 is the apparatus of any of Examples 32-36, wherein the one or more files are to be used by a container supported by the host system.

Example 38 is the apparatus of any of Examples 32-37, wherein the corresponding first values are used to identify the one or more files to be used by a container executing a service and wherein the corresponding second values are used to identify the one or more files to be used by a container executing a job.

Example 39 is the apparatus of any of Examples 32-38, further comprising: means for receiving, from a host system, a request for one or more files of the plurality of files of the container image, the request comprising a threshold value associated with a combination of the corresponding first values and the corresponding second values.

Unless specifically stated otherwise, terms such as "receiving," "identifying," "transmitting," "generating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   providing a container image comprising a plurality of files to a plurality of containers;
   receiving, from a first set of containers of the plurality of containers, first indications of a first set of files of the plurality of files being used prior to the first set of containers reaching a ready state;
   determining, by a processing device, corresponding first values for each file of the plurality of files in view of the first indications, wherein the corresponding first values are associated with a first probability that each file will be used prior to a new container reaching the ready state;
   receiving, from a second set of containers the plurality of containers, second indications of a second set of files of the plurality of files being used after the second set of containers have reached the ready state;
   determining corresponding second values for each file of the plurality of files in view of the second indications, wherein the corresponding second values are associated with a second probability that each file will be used before or after the new container reaches the ready state;
   receiving, from a host system, a request for one or more files of the plurality of files of the container image, the request comprising a threshold value associated with one of the corresponding first values;
   identifying the one or more files of the plurality of files having the corresponding first values that satisfy the threshold value; and
   providing the one or more files to the host system.

2. The method of claim 1, wherein the corresponding first values and the corresponding second values for each of the plurality of files are stored as metadata associated with each of the plurality of files.

3. The method of claim 1, further comprising:
   receiving, from the host system, a subsequent request for a particular file of the plurality of files;
   halting the providing of the one or more files to the host system;
   providing the particular file to the host system; and
   resuming the providing of the one or more files to the host system.

4. The method of claim 1, wherein the one or more files are to be used by a container supported by the host system.

5. The method of claim 1, wherein the corresponding first values are used to identify the one or more files to be used by a container executing a service and wherein the corresponding second values are used to identify the one or more files to be used by a container executing a job.

6. The method of claim 1, further comprising:
   receiving, from the host system, a request for one or more files of the plurality of files of the container image, the request comprising a threshold value associated with a combination of the corresponding first values and the corresponding second values.

7. A system comprising:
   a memory; and
   a processing device, operatively coupled to the memory, to:
      provide a container image comprising a plurality of files to a plurality of containers;
      receive, from a first set of containers of the plurality of containers, first indications of a first set of files of the plurality of files being used prior to the first set of containers reaching a ready state;
      determine corresponding first values for each file of the plurality of files in view of the first indications, wherein the corresponding first values are associated with a first probability that each file will be used prior to a new container reaching the ready state;
      receive, from a second set of containers the plurality of containers, second indications of a second set of files of the plurality of files being used after the second set of containers have reached the ready state;
      determine corresponding second values for each file of the plurality of files in view of the second indications, wherein the corresponding second values are associated with a second probability that each file will be used before or after the new container reaches the ready state;

receive, from a host system, a request for one or more files of the plurality of files of the container image, the request comprising a threshold value associated with one of the corresponding first values;

identify the one or more files of the plurality of files having the corresponding first values that satisfy the threshold value; and provide the one or more files to the host system.

8. The system of claim 7, wherein the corresponding first values and the corresponding second values for each of the plurality of files are stored as metadata associated with each of the plurality of files.

9. The system of claim 7, wherein the processing device is further to:

receive, from the host system, a subsequent request for a particular file of the plurality of files;

halt the providing of the one or more files to the host system;

provide the particular file to the host system; and resume the providing of the one or more files to the host system.

10. The system of claim 7, wherein the one or more files are to be used by a container supported by the host system.

11. The system of claim 7, wherein the corresponding first values are used to identify the one or more files to be used by a container executing a service and wherein the corresponding second values are used to identify the one or more files to be used by a container executing a job.

12. The system of claim 7, wherein the processing device is further to:

receive, from the host system, a request for one or more files of the plurality of files of the container image, the request comprising a threshold value associated with a combination of the corresponding first values and the corresponding second values.

13. A non-transitory computer-readable storage medium including instructions that, when executed by a processing device, cause the processing device to:

provide a container image comprising a plurality of files to a plurality of containers;

receive, from a first set of containers of the plurality of containers, first indications of a first set of files of the plurality of files being used prior to the first set of containers reaching a ready state;

determine, by the processing device, corresponding first values for each file of the plurality of files in view of the first indications, wherein the corresponding first values are associated with a first probability that each file will be used prior to a new container reaching the ready state;

receive, from a second set of containers the plurality of containers, second indications of a second set of files of the plurality of files being used after the second set of containers have reached the ready state;

determine corresponding second values for each file of the plurality of files in view of the second indications, wherein the corresponding second values are associated with a second probability that each file will be used before or after the new container reaches the ready state;

receive, from a host system, a request for one or more files of the plurality of files of the container image, the request comprising a threshold value associated with one of the corresponding first values;

identify the one or more files of the plurality of files having the corresponding first values that satisfy the threshold value; and provide the one or more files to the host system.

14. The non-transitory computer-readable storage medium of claim 13, wherein the corresponding first values and the corresponding second values for each of the plurality of files are stored as metadata associated with each of the plurality of files.

* * * * *